(12) United States Patent
Koehler, III

(10) Patent No.: US 9,121,391 B1
(45) Date of Patent: Sep. 1, 2015

(54) SOLAR POWER GENERATING AND ADVERTISING INCOME SYSTEM

(71) Applicant: Robert L Koehler, III, Aurora, IL (US)

(72) Inventor: Robert L Koehler, III, Aurora, IL (US)

( * ) Notice: Subject to any disclaimer, the term of this patent is extended or adjusted under 35 U.S.C. 154(b) by 243 days.

(21) Appl. No.: 13/860,633

(22) Filed: Apr. 11, 2013

Related U.S. Application Data

(60) Provisional application No. 61/624,479, filed on Apr. 16, 2012.

(51) Int. Cl.
| | | |
|---|---|---|
| *B60K 16/00* | (2006.01) | |
| *G09F 13/00* | (2006.01) | |
| *F03G 6/00* | (2006.01) | |
| *F03G 6/06* | (2006.01) | |
| *G09F 13/22* | (2006.01) | |
| *G09F 13/04* | (2006.01) | |

(52) U.S. Cl.
CPC *F03G 6/00* (2013.01); *F03G 6/001* (2013.01); *F03G 6/06* (2013.01); *G09F 13/005* (2013.01); *G09F 13/04* (2013.01); *G09F 13/0404* (2013.01); *G09F 13/22* (2013.01)

(58) Field of Classification Search
CPC ............ F03G 6/00; F03G 6/06; F03G 6/001; G09F 13/005; G09F 13/0404; G09F 13/04; G09F 13/22

USPC .............. 60/641.8–641.15; 40/624, 446, 463, 40/465, 541
See application file for complete search history.

(56) References Cited

U.S. PATENT DOCUMENTS

| | | | |
|---|---|---|---|
| 6,118,426 A * | 9/2000 | Albert et al. ................... | 345/107 |
| 7,237,360 B2 | 7/2007 | Moncho et al. | |
| 7,716,861 B2 * | 5/2010 | Stadjuhar, Jr. .................. | 40/564 |
| 8,104,203 B2 * | 1/2012 | Mackler .......................... | 40/492 |
| 2008/0155869 A1 * | 7/2008 | Golle et al. ...................... | 40/544 |
| 2009/0183405 A1 | 7/2009 | Wilkes | |
| 2010/0000134 A1 | 1/2010 | Mackler | |
| 2010/0000596 A1 | 1/2010 | Mackler | |
| 2010/0011637 A1 * | 1/2010 | Zhang ............................. | 40/442 |
| 2010/0132234 A1 * | 6/2010 | Winkler .......................... | 40/431 |
| 2010/0133850 A1 | 6/2010 | Winkler | |
| 2011/0231231 A1 | 9/2011 | Cruz | |

* cited by examiner

*Primary Examiner* — Hoang Nguyen
(74) *Attorney, Agent, or Firm* — RG Patent Consultants; Rachel Gilboy

(57) ABSTRACT

A solar power generating and advertising income system including a solar power array assembly having a support framework, a plurality of solar power panels each having a photovoltaic surface, lighted display panels having a media viewable surface, power storage batteries, a power inverter, and a programmable processor unit.

20 Claims, 5 Drawing Sheets

SOLAR POWER GENERATING AND ADVERTISING INCOME SYSTEM

CROSS-REFERENCE TO RELATED APPLICATION

The present application is related to and claims priority from prior provisional application Ser. No. 61/624,479, filed Apr. 16, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of advertising and more specifically relates to green technology via a solar power generating and advertising income system.

2. Description of the Related Art

The electric power industry provides the production and delivery of electric energy, often known as power, or electricity, in sufficient quantities to areas that need electricity through a grid connection. The grid distributes electrical energy to customers. Electric power is generated by central power stations or by distributed generation.

Many households and businesses need access to electricity, especially in developed nations, the demand being scarcer in developing nations. Demand for electricity is derived from the requirement for electricity in order to operate domestic appliances, office equipment, industrial machinery and provide sufficient energy for both domestic and commercial lighting, heating, cooking and industrial processes. Electricity costs are a significant ongoing cost for every home and business, with the tendency to rise rather than fall. As available electricity becomes gradually diminished in large cities because of the increasing number of entities requiring power, costs tend to rise. Methods of creating electricity have a diminished return as well. For example, when electricity is produced from natural gas, there is an estimated loss of 66% in efficiency. The installation cost of wind technology is staggering and incurs excessive maintenance cost. In addition to being inefficiently produced, the cost is passed on to consumers.

The cost of producing electricity, which the consumer pays for, can render some businesses non-viable. When monthly expenses are paid, electricity costs can take a big bite out of profits, or worse, put a business in the red. Innovative businesses attempt to generate revenue in efficient and unorthodox ways. Innovative methods are needed to reduce expenses in the area of energy consumption for advertising as well.

Various attempts have been made to solve the above-mentioned problems such as those found in U.S. Pat. Nos. 2010/0000596; 2010/0000134; U.S. Pat. No. 7,237,360; 2010/0133850; 2009/0183405; and 2011/0231231. This art is representative of solar powered displays. None of the above inventions and patents, taken either singly or in combination, is seen to describe the invention as claimed.

Ideally, a solar powered display should be electrically self sufficient, yet would operate reliably and be manufactured at a modest expense. Thus, a need exists for a reliable solar power generating and advertising income system to be electrically self sufficient and generate additional monetary income, and to avoid the above-mentioned problems.

BRIEF SUMMARY OF THE INVENTION

In view of the foregoing disadvantages inherent in the known solar powered display art, the present invention provides a novel solar power generating and advertising wifi and cell income system. The general purpose of the present invention, which will be described subsequently in greater detail, is to provide electrically self sufficiency while generating additional monetary income.

A solar power generating and advertising income system as disclosed herein in a preferred embodiment may comprise a solar power array assembly having a support framework, a plurality of solar power panels each having a photovoltaic surface, at least one lighted stagnate or LCD display panel having a media viewable surface, at least one power storage battery, a micro power inverter, and a programmable processor unit. The plurality of solar power panels are supported and removably mounted to the support framework such that the photovoltaic surfaces are coplanar and are inclined to have a substantially southern solar exposure. The support framework positions the solar power panels at an advantageous angle for receiving the maximum available solar exposure. Some embodiments may have solar tracking apparatuses.

The present invention will also include long range parabolic antennas for use of free wifi capability. Through the installation of a 10 GB single mode network that will be installed on the structure or remotely (due to weight restrictions to power via wifi and or giving the structure cell site capabilities). Inside a NEMA rated climate controlled network cabinet, it will include room to accommodate large amp (deep cycle) batteries that will draw their charge thought DC power supplied by the solar array. It will include room to accommodate large amp (deep cycle) batteries for charge through D/C power supplied by the solar array. The long range 2.4 (up to 5.8) GHz 24 DB parabolic/omni antenna will provide consumers the ability to surf the web and make free calls via the established wifi connection. Through the wifi established you will have the ability to support police bands and fire department signals as well as provide Amber Alerts. Also with the ability to connect to the wifi signal we will be able to use push technology that will provide the ability to send customers coupons, and discounts to customers connected to the wifi. It will also give them the ability to receive notifications about deals in the area and coupons for restaurants. Being able to sell search results to Google or other search engine corporations is another example of income that may be generated. The ability to install cell sites to the structure for lease of space will also provide income. This technology can be used by big box retailers, independent companies, or sport arenas. This will provide the ability to create business through impulse. The power provided will also negate the power consumed by the advertising display.

The support framework may position the plurality of solar power panels so that the solar power panels are substantially parallel planar. The lighted display panel(s) having the media viewable surface(s) are supported and removably mounted to the support framework so that the media viewable surface is exteriorly facing and positioned substantially vertical relative to a ground planar surface. The support framework positions the lighted display panel(s) having the media viewable surface(s) at a viewer appropriate angle which may vary in degrees depending on location. The lighted display panel(s) having a media viewable surface may be an LCD panel, stagnate display, or an LED panel so that a displayed visual message is viewable during low light and non-light hours. The lighted display panel(s) may be only a single LCD or LED panel in smaller embodiments with limited space. The lighted display panel(s) may also be multiple LCD or LED panels having the media viewable surfaces in a co-planar arrangement.

The photovoltaic surfaces of the solar power panels are able to convert solar energy to electrical energy. The power storage battery(s) that will be stored in a NEMA rated enclosure are in communication with the solar power panels such that the power storage battery(s) are able to receive and to store electrical power delivered from the solar power panel(s). The power storage battery(s) further may comprise at least two 6 volt (may be up to a 48 volt system) batteries wired to produce at least a 12 volt electrical system. The power inverter is in conductive communication with the power storage batteries such that the power inverter is able to invert the stored electrical power to an alternate useable voltage, such as converting from the battery voltage into 120/240 volts alternating current. The power inverter is also in electrical-communication with the utility power grid, when available, to that the unused electrical power generated may be sold back to the electric utility company.

The programmable processor unit is in communication with the lighted display panel(s) having the media viewable surface(s) such that user programmed advertisements are able to be displayed on the media viewable surface(s). The programmable processor unit may be a computer and may be able to produce a user programmed motion video or a series of user programmed still pictures that are able to be displayed on the media viewable surface(s). The programmable processor unit is able to be user-programmed such that multiple user programmed advertisements are able to be displayed continuously or at user-preferred scheduling times. The programmable processor unit may also be able to receive user programmed advertisements from a remote computer such that the user programmed advertisements are able to be displayed on the media viewable surface without the user having to be located at the solar power array assembly. The programmable processor unit may be able to receive a live streaming video in some embodiments. The solar power array assembly is usable for advertising a visual message and for simultaneously sending the un-used alternate useable voltage to the utility power grid for generating a second monetary income.

Wifi is an important feature of the present invention as it helps lower cost to consumers, may include push technology, supports police and fire department bands, streams video and news.

The solar power generating and advertising income system may comprise a kit having a support framework, a plurality of solar power panels each having a photovoltaic surface, at least one lighted display panel having a media viewable surface, a least one micro power inverter, a programmable processor unit, and at least one set of user installation, maintenance, and use instructions.

A method of using the solar power generating and advertising income system may comprise the steps of turning on a first power switch to the programmable processor unit, programming at least one user-preferred advertisement with scheduled display times, turning on a second power switch to at least one lighted display panel having a media viewable surface, and changing the user-preferred advertisement and scheduled display times as negotiated between a client and a user.

The present invention holds significant improvements and serves as a solar power generating and advertising income system inclusive of wifi and cell site leasing. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, solar power generating and advertising income system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a solar powered display device and more particularly to a solar powered generating and advertising income system as used to provide electrically self sufficiency and generate additional monetary income.

Generally speaking, a solar power generating and advertising income system is a method of advertising using stagnate, LCD, or LED public billboards while generating more income than needed to pay wifi cell site operating expenses. The system uses a South-facing solar array to maximize solar exposure while the North side has at least one lighted display panel having a media viewable surface for advertising. Part of the solar panels will provide voltage to charge power storage batteries to operate the lighted display panel(s). Power will be converted via the micro inverter to useable AC power at 120 volts AC and will supply consumer grade power back into the utility company power grid for a secondary monetary income. The programmable processor unit is user programmable for displaying advertisements/public information such as amber alerts, and may receive programming and streaming live video from a remote computer.

Figure 1:
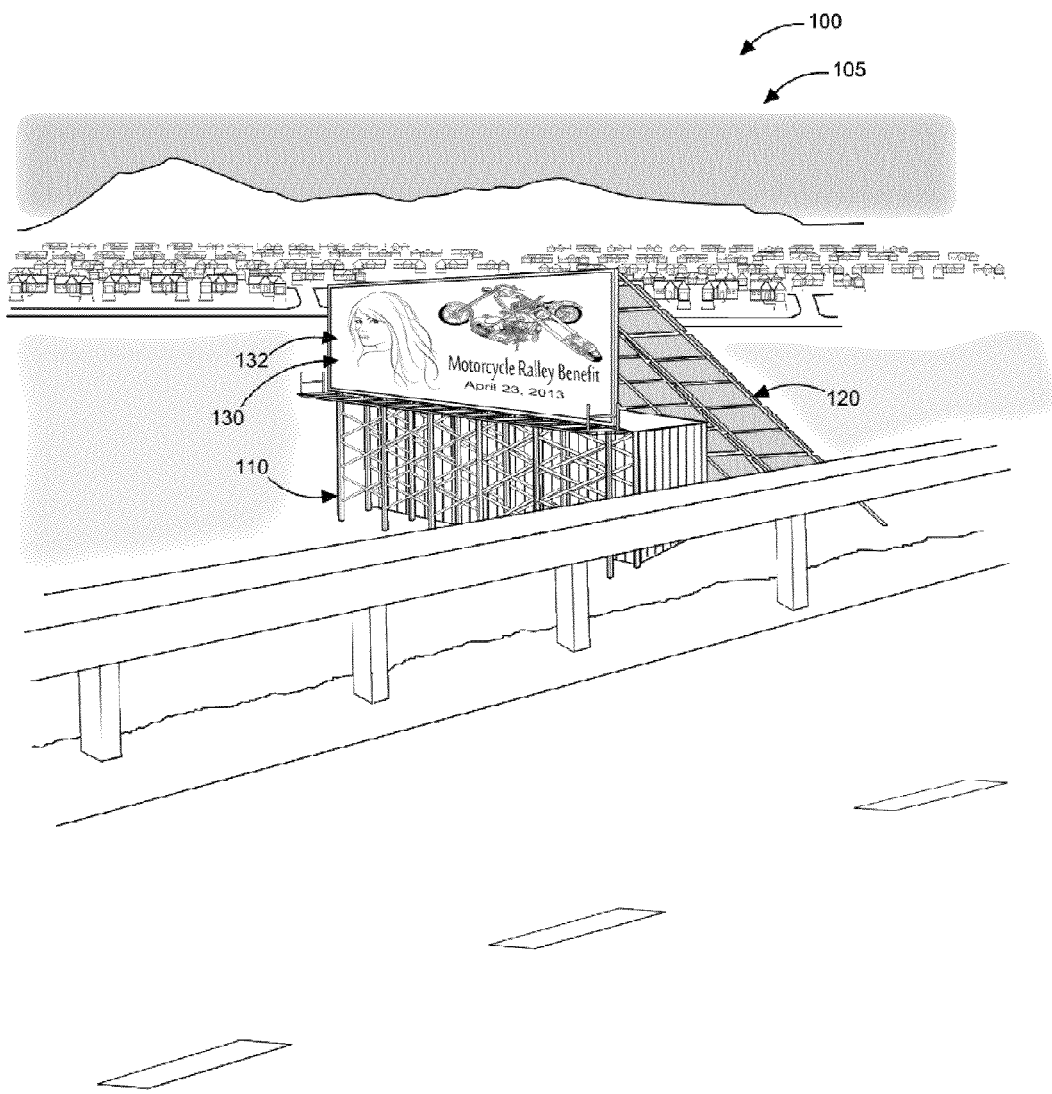
FIG. 1 shows a perspective view illustrating an in-use condition of a solar power generating and advertising income system according to an embodiment of the present invention.

In greater detail now referring to the drawings by numerals of reference, there is shown in FIG. 1, a perspective view illustrating an in-use condition of solar power generating and advertising income system 100 according to an embodiment of the present invention.

Solar power generating and advertising income system 100 may comprise solar power array assembly 105 having support framework 110, a plurality of solar power panels 120 each having photovoltaic surface(s) 122, at least one lighted display panel 130 having media viewable surface(s) 132, at least one power storage battery 140, power inverter 150, and programmable processor unit 160. The plurality of solar power panels 120 are supported and removably mounted to support framework 110 such that photovoltaic surface(s) 122 are coplanar and are inclined to have a substantially southern solar exposure. Support framework 110 positions solar power panels 120 at an advantageous angle for receiving maximum available solar exposure. Some embodiments may have solar tracking apparatuses. Programmable processor unit 160 may be able to receive live streaming video in some embodiments. Solar power array assembly 105 is usable for advertising visual messages and for simultaneously sending the un-used alternate useable voltage to a utility power grid for generating a second monetary income.

Figure 2:
FIG. 2 is a perspective view illustrating a second in-use condition of a solar power generating and advertising income system according to an embodiment of the present invention of FIG. 1.

Referring now to FIG. 2, a perspective view illustrating an alternate embodiment of an in-use condition of solar power generating and advertising income system 100 according to an embodiment of the present invention of FIG. 1.

Support framework 110 may position the plurality of solar power panels 120 so that solar power panels 120 are parallel planar. Lighted display panel(s) 130 having media viewable surface(s) 132 are supported and removably mounted to support framework 110 so that media viewable surface(s) 132 are exteriorly facing and positioned substantially vertical relative to a ground planar surface. Support framework 110 positions lighted display panel(s) 130 having media viewable surface(s) 132 at a viewer appropriate angle. Lighted display panel(s) 130 having a media viewable surface(s) 132 may be an LCD panel or an LED panel so that a displayed visual message is viewable during low light and non-light hours. Lighted display panel(s) 130 may be only a single LCD or LED panel in smaller embodiments with limited space. Lighted display panel(s) 130 may also be multiple LCD or LED panels having media viewable surface(s) 132 in a coplanar arrangement.

Figure 3:
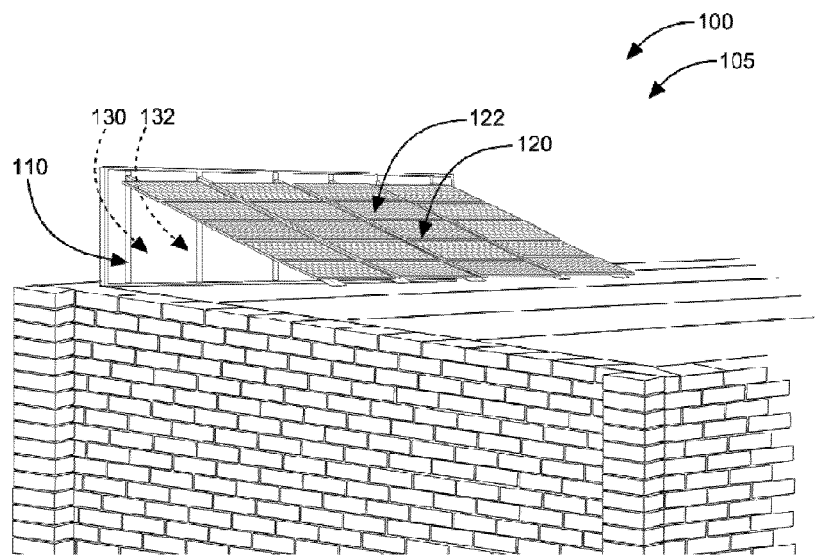
FIGS. 3, 3A, and 3B are perspective views illustrating a typical equipment arrangement of the solar power generating and advertising income system according to an embodiment of the present invention of FIG. 1.
Figure 3B:
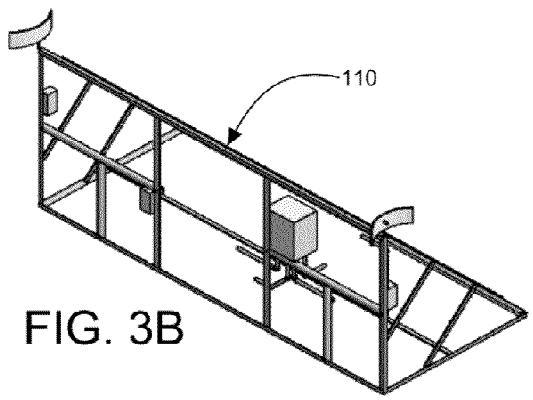
Figure 3A:
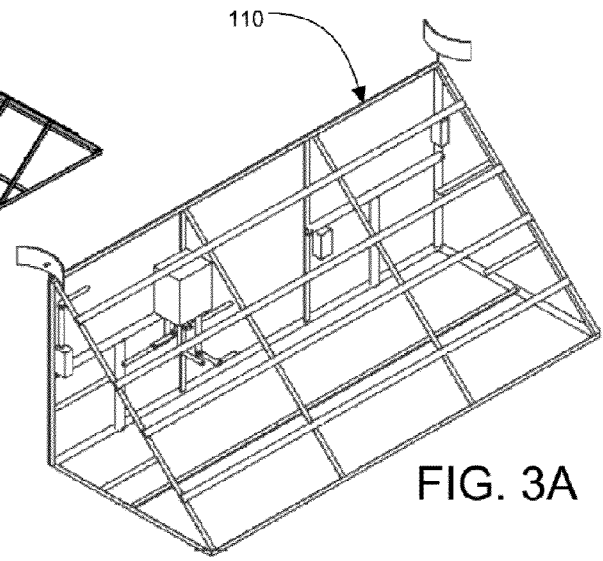

Referring now to FIGS. 3, 3A, and 3B, perspective views illustrating a rear view of solar power generating and advertising income system 100 according to an embodiment of the present invention of FIG. 1.

Photovoltaic surface(s) 122 of solar power panels 120 are able to convert solar energy to electrical energy. Power storage battery(s) 140 are in communication with solar power panels 120 such that power storage battery(s) 140 are able to receive and to store electrical power delivered from solar power panels 120. Power storage battery(s) 140 may further comprise at least two 6 volt batteries wired to produce a 12 volt electrical system. Power inverter 150 is in conductive communication with power storage battery(s) 140 such that power inverter 150 is able to invert stored electrical power to an alternate useable voltage, such as converting from 12 volts direct current into 120 volts alternating current. Power inverter 150 is also in electrical-communication with a utility power grid, when available, so that unused electrical power generated may be sold back to the electric utility company.

Figure 4:
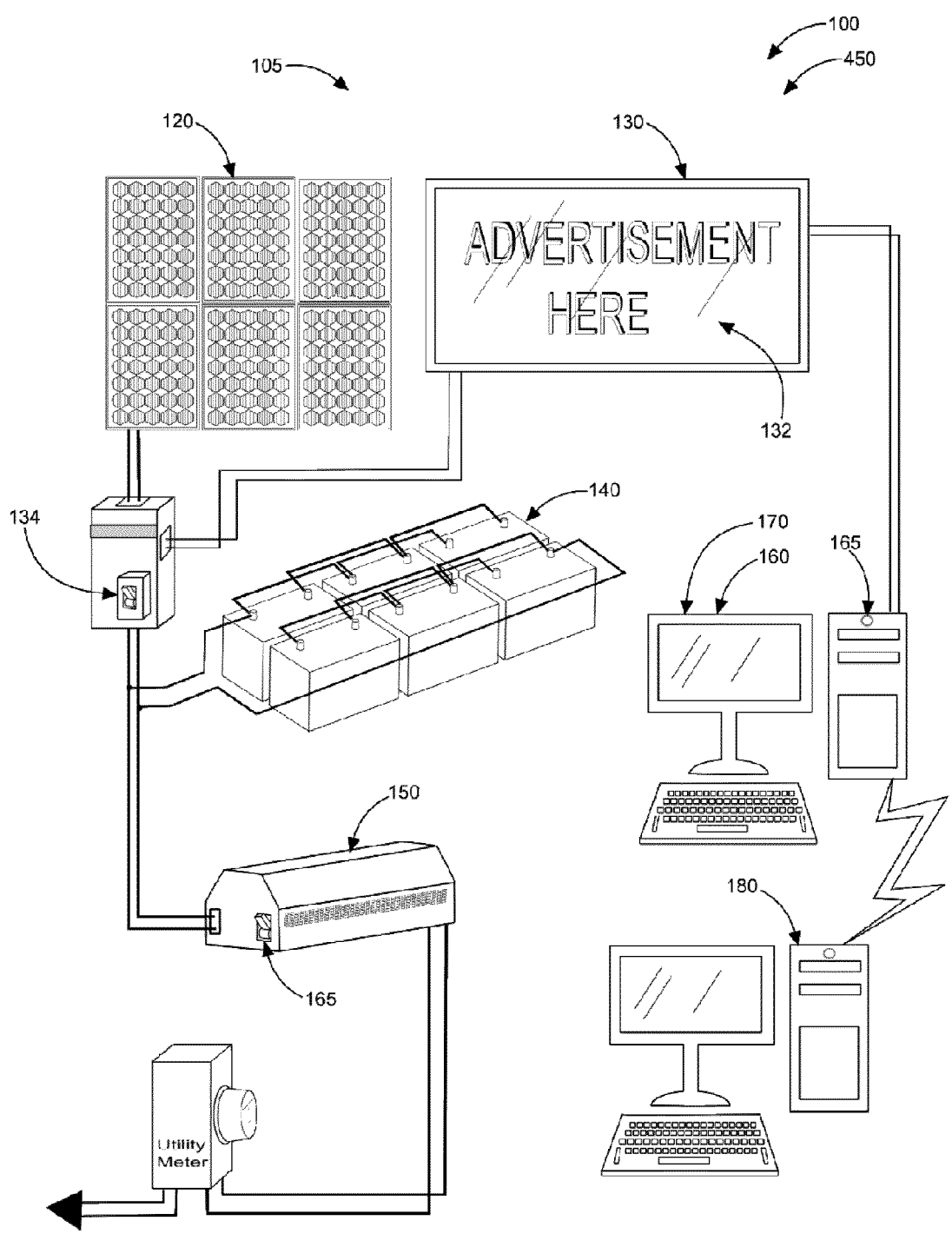
FIG. 4 is a diagram illustrating solar power generating and advertising income system according to an embodiment of the present invention of FIG. 1.

Referring now to FIG. 4, a diagram illustrating solar power generating and advertising income system 100 according to an embodiment of the present invention of FIG. 1.

Programmable processor unit 160 is in communication with lighted display panel(s) 130 (via single mode fiber optic networks) having media viewable surface(s) 132 such that user programmed advertisements are able to be displayed on media viewable surface(s) 132. Programmable processor unit 160 may be computer 170 and may be able to produce a user programmed motion video or a series of user programmed still pictures that are able to be displayed on media viewable surface(s) 132. Programmable processor unit 160 is able to be user-programmed such that multiple user programmed advertisements are able to be displayed continuously or at user-preferred scheduling times. Programmable processor unit 160 may also be able to receive user programmed advertisements from remote computer 180 such that the user programmed advertisements are able to be displayed on media viewable surface(s) 132 without the user having to be located at solar power array assembly 105.

Solar power generating and advertising income system 100 may be sold as kit 450 comprising the following parts: support framework 110; at least one (a plurality of) solar power panel(s) 120 having photovoltaic surface(s) 122; at least one lighted display panel(s) 130 having media viewable surface(s) 132; at least one power inverter 150; at least one programmable processor unit 160; and at least one set of user instructions. Solar power generating and advertising income system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
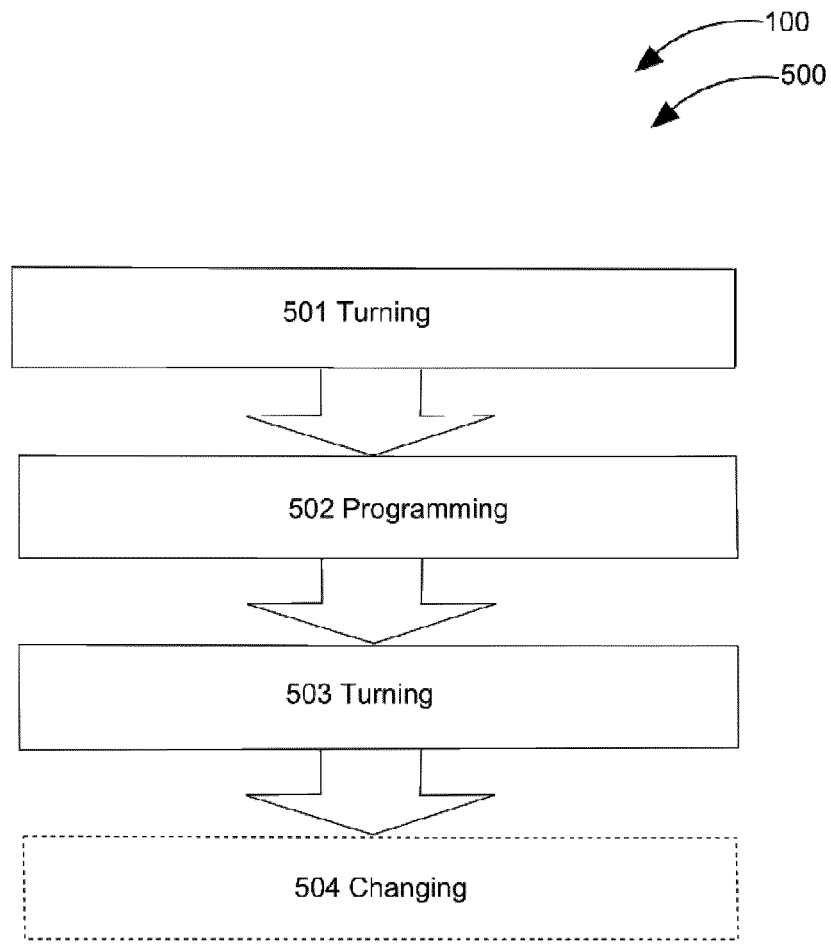
FIG. 5 is a flowchart illustrating solar power generating and advertising income system according to an embodiment of the present invention of FIGS. 1-4.

Referring now to FIG. 5, a flow chart illustrating method of use 500 for solar power generating and advertising income system 100.

A method of use for solar power generating and advertising income system 100 may comprise the steps of: step one 501 turning on first power switch 165 to programmable processor unit 160; step two 502 programming at least one user-preferred advertisement with scheduled display times; step three 503 turning on second power switch 134 to at least one lighted display panel(s) 130 having media viewable surface(s) 132; and step four 504 changing the user-preferred advertisement and scheduled display times as negotiated between a client and a user.

It should be noted that step 504 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A solar power generating and advertising income system comprising:
    a) a solar power array assembly having;
        i) a support framework;
        ii) a plurality of solar power panels each having a photovoltaic surface;
        iii) at least one lighted display panel having a media viewable surface;
        iv) at least one power storage battery and NEMA rated enclosure;
        v) a power inverter;
        vi) a programmable processor unit;
        vii) wifi and cell site leasing; and
        viii) parabolic/omni antennas;
    b) wherein said plurality of solar power panels are supported and removably mounted to said support framework such that said photovoltaic surfaces are coplanar and are inclined such that said photovoltaic surfaces have a substantially southern solar exposure;
    c) wherein said at least one lighted display panel having said media viewable surface is supported and removably mounted to said support framework such that said media viewable surface is exteriorly facing and positioned substantially vertical relative to a ground planar surface;
    d) wherein said photovoltaic surfaces of said plurality of solar power panels are able to convert solar energy to electrical energy;
    e) wherein said at least one power storage battery is in communication with said plurality of solar power panels such that said at least one power storage battery is able to receive and to store electrical power delivered from said plurality of solar power panels;
    f) wherein said power inverter is in conductive communication with said at least one power storage battery such that said power inverter is able to invert said electrical power to an alternate useable voltage;
    g) wherein said power inverter is also in electrical-communication with a utility power grid;
    h) wherein said parabolic/omni antennas and said wifi and cell site leasing enables communication to users and creates a second monetary income;
    i) wherein said programmable processor unit is in communication with said at least one lighted display panel having said media viewable surface such that a user programmed advertisement is able to be displayed on said media viewable surface; and
    j) wherein said solar power array assembly is usable for advertising a visual message and for simultaneously providing an un-used said alternate useable voltage to said utility power grid for generating said second monetary income.

2. The solar power generating and advertising income system of claim 1 wherein said support framework positions said plurality of solar power panels at an advantageous angle for receiving a maximum available solar exposure.

3. The solar power generating and advertising income system of claim 2 wherein said support framework positions said at least one lighted display panel having said media viewable surface at a viewer appropriate angle.

4. The solar power generating and advertising income system of claim 2 wherein said support framework positions said plurality of solar power panels such that said plurality of solar power panels are parallel planar.

5. The solar power generating and advertising income system of claim 1 wherein said at least one lighted display panel having said media viewable surface is an LCD panel such that a displayed said visual message is viewable during low light and non-light hours.

6. The solar power generating and advertising income system of claim 1 wherein said at least one lighted display panel having said media viewable surface is an LED panel such that a displayed said visual message is viewable during low light and non-light hours.

7. The solar power generating and advertising income system of claim 5 wherein said at least one lighted display panel is a single LCD panel.

8. The solar power generating and advertising income system of claim 1 wherein said at least one lighted display panel is a single LED panel.

9. The solar power generating and advertising income system of claim 5 wherein said at least one lighted display panel comprises multiple said LCD panels such that said media viewable surfaces are co-planar.

10. The solar power generating and advertising income system of claim 6 wherein said at least one lighted display panel comprises multiple said LED panels such that said media viewable surfaces are co-planar.

11. The solar power generating and advertising income system of claim 1 wherein said at least one power storage battery further comprises a plurality of 6 volt batteries wired to produce a 12 volt electrical system.

12. The solar power generating and advertising income system of claim 1 wherein said power inverter is able to convert 12 volts direct current into 120 volts alternating current.

13. The solar power generating and advertising income system of claim 1 wherein said programmable processor unit comprises a computer.

14. The solar power generating and advertising income system of claim 13 wherein said programmable processor unit is able to produce a user programmed motion video and alternately a series of user programmed still pictures such that said motion video and said still pictures are able to be displayed on said media viewable surface.

15. The solar power generating and advertising income system of claim 14 wherein said programmable processor unit is able to receive user programmed advertisements from a remote said computer such that said user programmed advertisements are able to be displayed on said media viewable surface without said user being located at said solar power array assembly.

16. The solar power generating and advertising income system of claim 15 wherein said programmable processor unit is able to be user-programmed such that a plurality of unlike said user programmed advertisements are able to be displayed at user-preferred times.

17. The solar power generating and advertising income system of claim 16 wherein said programmable processor unit is able to receive streaming video.

18. A solar power generating and advertising income system comprising:
   a) a solar power array assembly having;
      i) a support framework;
      ii) a plurality of solar power panels each having a photovoltaic surface;
      iii) at least one lighted display panel having a media viewable surface;
      iv) at least one power storage battery;
      v) a power inverter; and
      vi) a programmable processor unit;
   b) wherein said plurality of solar power panels are supported and removably mounted to said support framework such that said photovoltaic surfaces are coplanar and are inclined such that said photovoltaic surfaces have a substantially southern solar exposure;
   c) wherein said support framework positions said plurality of solar power panels at an advantageous angle for receiving a maximum available solar exposure;
   d) wherein said support framework positions said plurality of solar power panels such that said plurality of solar power panels are parallel planar;
   e) wherein said at least one lighted display panel having said media viewable surface is supported and removably mounted to said support framework such that said media viewable surface is exteriorly facing and positioned substantially vertical relative to a ground planar surface;
   f) wherein said support framework positions said at least one lighted display panel having said media viewable surface at a viewer appropriate angle;
   g) wherein said at least one lighted display panel having said media viewable surface is an LCD panel such that a displayed said visual message is viewable during low light and non-light hours;
   h) wherein said at least one lighted display panel is a single said LCD panel;
   i) wherein said at least one lighted display panel comprises multiple said LCD panels such that said media viewable surfaces are co-planar;
   j) wherein said photovoltaic surfaces of said plurality of solar power panels are able to convert solar energy to electrical energy;
   k) wherein said at least one power storage battery is in communication with said plurality of solar power panels such that said at least one power storage battery is able to receive and to store electrical power delivered from said plurality of solar power panels;
   l) wherein said at least one power storage battery further comprises a plurality of 6 volt batteries wired to produce a 12 volt electrical system;
   m) wherein said power inverter is in conductive communication with said at least one power storage battery such that said power inverter is able to invert said electrical power to an alternate useable voltage;
   n) wherein said power inverter is able to convert 12 volts direct current into 120 volts alternating current;
   o) wherein said power inverter is in electrical-communication with a utility power grid;
   p) wherein said programmable processor unit is in communication with said at least one lighted display panel having said media viewable surface such that a user programmed advertisement is able to be displayed on said media viewable surface;
   q) wherein said programmable processor unit comprises a computer;
   r) wherein said programmable processor unit is able to produce a user programmed motion video and alternately a series of user programmed still pictures such that said motion video and said still pictures are able to be displayed on said media viewable surface;
   s) wherein said programmable processor unit is able to be user-programmed such that a plurality of unlike user programmed advertisements are able to be displayed at user-preferred times;
   t) wherein said programmable processor unit is able to receive said user programmed advertisements from a remote said computer such that said user programmed advertisements are able to be displayed on said media viewable surface without said user being located at said solar power array assembly;
   u) wherein said programmable processor unit is able to receive streaming video; and
   v) wherein said solar power array assembly is usable for advertising a visual message and for simultaneously providing an un-used said alternate useable voltage to said utility power grid for generating a second monetary income.

19. The solar power generating and advertising income system of claim 18 further comprising a kit having:
   a) a parabolic antennas/NEMA rated network enclosure;
   b) said support framework and cell antenna mounts;
   c) a plurality of said solar power panels each having said photovoltaic surface;
   d) at least one said lighted display panel having said media viewable surface;
   e) a least one said power inverter;
   f) a charge controller/micro transfer switch;
   g) said programmable processor unit; and
   h) at least one set of user instructions.

20. A method of using a solar power generating and advertising income system of claim 18 comprising the steps of:
   a) turning on a first power switch to a programmable processor unit;
   b) programming at least one user-preferred advertisement and scheduled display times;
   c) turning on a second power switch to at least one lighted display panel having a media viewable surface; and
   d) changing said at least one user-preferred advertisement and said scheduled display times as negotiated between a client and a user.

* * * * *